Patented June 21, 1938

2,121,169

UNITED STATES PATENT OFFICE 2,121,169

PROCESS OF CONTACTING HYDROCARBON VAPORS WITH AMMONIUM PENTACHLORODIZINCATE

Franklin E. Kimball, Los Angeles, Calif.

No Drawing. Application March 26, 1937,
Serial No. 133,262

4 Claims. (Cl. 196—36)

This application is in part a continuation of my copending applications Serial Nos. 55,415, filed December 20, 1935; 56,375, filed December 27, 1935; 77,385, filed May 1, 1936 and 91,788, filed July 21, 1936, for similar processes of contacting hydrocarbon vapors with ammonium pentachlorodizincate.

This invention relates to processes of contacting hydrocarbon vapors with ammonium pentachlorodizincate and has for its object to render more expeditious and cheaper the applications of the processes.

In the applications of various previously employed processes of contacting hydrocarbon vapors with ammonium pentachlorodizincate in maintained aqueous solution hydrogen oxide vapor constriction of hydrocarbon vapor throughput is incurred.

Instead of incurring hydrogen oxide vapor constriction of hydrocarbon vapor throughput in the contacting of hydrocarbon vapors with a treating-mixture containing ammonium pentachlorodizincate and chloride salt (of the genus of chloride salt which forms an eutectic mixture with ammonium pentachlorodizincate, of the species of said chloride salt whose ammonium pentachlorodizincate eutectic mixture fusion-temperature is above a temperature of 355 degrees Fahrenheit and of the variety of said chloride salt which is solid at a temperature of 480 degrees Fahrenheit), I may employ the use of the step which comprises contacting said vapors with a fused mixture containing sufficient ammonium pentachlorodizincate to prevent separation of said chloride salt and sufficient of said eutectic chloride to prevent separation of ammonium pentachlorodizincate at a temperature above said treating-mixture fusion-temperature and at a temperature below 480 degrees Fahrenheit.

Pure ammonium pentachlorodizincate melts at a temperature of approximately 480 degrees Fahrenheit. Pure zinc chloride melts at a temperature of approximately 540 degrees Fahrenheit. Pure ammonium chloride begins to dissociate at a temperature of approximately 540 degrees Fahrenheit. Ammonium chloride does not melt with heat. It decomposes with heat. Pure zinc chloride and pure ammonium pentachlorodizincate form an eutectic mixture melting at a temperature of approximately 446 degrees Fahrenheit. Pure ammonium chloride and pure ammonium pentachlorodizincate form an eutectic mixture melting at a temperature of approximately 355 degrees Fahrenheit.

It is found that the approximately equi-molecular admixing of zinc chloride and of ammonium pentachlorodizincate at a temperature of approximately 446 degrees Fahrenheit forms liquefied zinc chloride and liquefied ammonium pentachlorodizincate in approximately equi-molecular proportions. Excess zinc chloride will remain in the crystalline form. Excess ammonium pentachlorodizincate will remain in the crystalline form. Ammonium chloride added to the melt first fuses and then effects return of the melt to approximately equi-molecular proportions of zinc chloride and of ammonium pentachlorodizincate. The ammonium chloride reacts with part of the free zinc chloride and then separates out as ammonium pentachlorodizincate together with sufficient additional ammonium pentachlorodizincate to effect return of the melt to approximately equi-molecular proportions of zinc chloride and of ammonium pentachlorodizincate. By the means of chemical analyses the chemical composition of this separated crystalline ammonium pentachlorodizincate is found to be represented by the chemical formula $NH_4Zn_2Cl_5$.

Similarly it may be shown that it is found that admixing approximately seven parts of zinc chloride and one part of ammonium chloride at a temperature of approximately 446 degrees Fahrenheit forms liquefied zinc chloride and liquefied ammonium pentachlorodizincate in proportions that may be considered to be approximately equi-molecular proportions of zinc chloride and of ammonium pentachlorodizincate.

It is found that the approximately equi-molecular admixing of ammonium chloride and of ammonium pentachlorodizincate at a temperature of approximately 355 degrees Fahrenheit forms liquefied ammonium chloride and liquefied ammonium pentachlorodizincate in approximately equi-molecular proportions. Excess ammonium chloride will remain in the crystalline form. Excess ammonium pentachlorodizincate will remain in the crystalline form. Zinc chloride added to the melt first fuses and then effects return of the melt to approximately equi-molecular proportions of ammonium chloride and of ammonium pentachlorodizincate. The zinc chloride reacts with part of the free ammonium chloride and then separates out as ammonium pentachlorodizincate together with sufficient additional ammonium pentachlorodizincate to effect return of the melt to approximately equi-molecular proportions of ammonium chloride and of ammonium pentachlorodizincate. By the means of chemical analyses the chemical composition of this separated crystalline ammonium pentachlorodizincate is found to be represented by the chemical formula $NH_4Zn_2Cl_5$.

Similarly it may be shown that it is found that admixing approximately three parts of zinc chloride and one part of ammonium chloride at a temperature of approximately 355 degrees Fahrenheit forms liquefied ammonium chloride and liquefied ammonium pentachlorodizincate in proportions that may be considered to be approximately equi-molecular proportions of ammonium chloride and of ammonium pentachlorodizincate.

It is to be understood that the approximately equi-molecular proportions of ammonium pentachlorodizincate and of the said chloride salt whose uses have been employed in the obtaining of the results of the hereinabove described research experiments are approximately the same proportions which existed in the parallel melts prepared from zinc chloride and ammonium chloride and which produced the parallel results.

Zinc chloride and ammonium chloride are examples of a chloride salt complying with the subgeneric limitations herein set forth which are identified by being enclosed with parentheses.

Solid ammonium chloride exists only in the form of the needle-like crystals which pack down and form the intervening interstices too small to conduct the hydrocarbon vapors through the ammonium chloride with a practical velocity.

Solid ammonium pentachlorodizincate in its applications to cracked hydrocarbon vapors receives a protective coating of carbonized polymerized gums. Various gasoline vapors and various gum-forming vapors become polymerized by the catalytic action of ammonium pentachlorodizincate. Various gasoline hydrocarbons, not polymerized by ammonium pentachlorodizincate at temperatures lower than ammonium pentachlorodizincate melting-temperature, become polymerized by ammonium pentachlorodizincate at temperatures higher than ammonium pentachlorodizincate melting-temperature. At a temperature of approximately 350 to 380 degrees Fahrenheit it is found that ammonium pentachlorodizincate is solid, that said gasoline vapors are not polymerized and that said gum-forming vapors are polymerized by ammonium pentachlorodizincate.

It is found that hydrogen sulphide separates zinc sulphide from ammonium pentachlorodizincate. It is found that supplying sufficient hydrogen chloride to the hydrocarbon vapors containing hydrogen sulphide prevents the separation of zinc sulphide from ammonium pentachlorodizincate. It is found that supplying sufficient hydrogen chloride to hydrocarbon vapors containing gum-forming vapors accelerates the catalysis of the polymerization of the gum-forming vapors with ammonium pentachlorodizincate. It is found that ammonium pentachlorodizincate is more deliquescent than zinc chloride. It is found that zinc chloride is more deliquescent than other substances whose uses have heretofore been employed in a liquid phase containing sufficient hydrogen chloride to catalyze the polymerization of the gum-forming vapors. It is found that hydrogen oxide lowers the fusion-temperature of an eutectic mixture of chloride salt and of ammonium pentachlorodizincate. It is found that if there be not too much hydrogen oxide present it effects color stabilizing. Instead of incurring undue hydrogen oxide vapor constriction of hydrocarbon vapor throughput in the contacting of vapors containing hydrogen oxide vapor, color-forming vapors, hydrocarbon vapors, gum-forming vapors, hydrogen sulphide and hydrogen chloride with a treating-mixture containing chloride salt (of the genus of chloride salt which forms an eutectic mixture with ammonium pentachlorodizincate, of the species of said chloride salt whose ammonium pentachlorodizincate eutectic mixture fusion-temperature is above a temperature of 355 degrees Fahrenheit and of the variety of said chloride salt which is solid at a temperature of 480 degrees Fahrenheit), ammonium pentachlorodizincate, hydrogen oxide and hydrogen chloride, I may employ the use of the combination of steps which comprises supplying to said vapors sufficient hydrogen oxide vapor to lower the fusion-temperature of a mixture of the same ratio of quantities of said chloride salt and of ammonium pentachlorodizincate present in said treating-mixture, supplying to said vapors sufficient hydrocarbon vapors to have separated zinc chloride from an aqueous saturated zinc chloride solution at a temperature above said aqueous saturated zinc chloride solution boiling-temperature and at a temperature below 480 degrees Fahrenheit, supplying to said vapors sufficient hydrogen chloride to catalyze polymerization of the gum-forming vapors and to prevent separation of zinc sulphide, contacting said vapors with a fused mixture containing sufficient said chloride salt to prevent separation of ammonium pentachlorodizincate, sufficient ammonium pentachlorodizincate to prevent separation of said chloride salt, sufficient hydrogen oxide to lower the fusion-temperature of a mixture of the same ratio of quantities of said chloride salt and of ammonium pentachlorodizincate present in said treating-mixture and sufficient hydrogen chloride to prevent separation of zinc sulphide and to catalyze polymerization of the gum-forming vapors at a temperature above said treating-mixture fusion-temperature and at a temperature below fusion-temperature of a mixture of the same ratio of quantities of said chloride salt and of ammonium pentachlorodizincate present in said treating-mixture, supplying said chloride salt and ammonium pentachlorodizincate to the treating-mixture, separating and withdrawing the vapors from the treating-mixture, withdrawing from the treating-mixture a mixture of hydrogen oxide, said chloride salt, ammonium pentachlorodizincate and hydrogen chloride containing products of treatment, partially cooling and partially condensing the withdrawn vapors, separating and withdrawing the vapors from condensed gums and withdrawing the condensed gums.

In explanation it is pointed out that there is employed the uses (1) of sufficient hydrocarbon vapors to lower the temperature of the boiling-point of an aqueous saturated zinc chloride solution had it been present, (2) of sufficient degree of heat to be above the temperature of the boiling-point of an aqueous saturated zinc chloride solution had it been present and (3) of a treating-mixture which is operative under said conditions under which an aqueous saturated zinc chloride solution would have been rendered inoperative by being reduced to solid zinc chloride and hydrogen oxide vapor.

I will hereinbelow describe a preferred embodiment of my improvements in the processes of treating hydrocarbon vapors with ammonium pentachlorodizincate. The description is an example of an illustration portraying my improvements. It is to be understood that my invention is not limited nor restricted to the employment of the uses of the precise salts, mixtures, concentrations, quantities, proportions, temperatures nor pressures whose uses are employed in the operation of such an illustrative process as is thus hereinbelow described as being a practical example of an application which portrays my improvements.

In the application of such an illustrative process hydrocarbon oil containing sulphur, oxygen and nitrogen in chemical combination may be continuously supplied to a suitable heater and continuously cracked under pressure by processes well known to those skilled in the art of manufacturing gasoline. Hydrocarbon vapors containing polymerizable gasoline vapors, polymerizable gum-forming vapors, color-forming vapors and hydrogen sulphide may thereby be continuously formed.

At a pressure of approximately 50 to 100 pounds per square inch gage pressure the cracked hydrocarbon vapors may be partially cooled and partially condensed to such a degree that the vapors continuously being withdrawn from the dephlegmating vessel may be reduced to a pressure of approximately 10 to 15 pounds per square inch gage pressure and to a temperature of approximately 340 to 370 degrees Fahrenheit.

It is found that a temperature of approximately 354 degrees Fahrenheit is below fusion-temperature of a mixture of approximately 18 parts of zinc chloride and 6 parts of ammonium chloride. It is found that a temperature of approximately 354 degrees Fahrenheit is above fusion-temperature of a mixture of approximately 18 parts of zinc chloride, 6 parts of ammonium chloride and 1 part of hydrogen oxide. I will describe an application employing the uses of a temperature of approximately 354 degrees Fahrenheit and of a treating-mixture containing approximately 18 parts of zinc chloride, 6 parts of ammonium chloride and 1 part of hydrogen oxide. It is found that 1 part of hydrogen oxide is insufficient to maintain 18 parts of zinc chloride in the liquid phase in the presence of hydrocarbon vapors at a temperature of approximately 354 degrees Fahrenheit.

The pressures of the application of the treatment of the hydrocarbon vapors may be controlled by employing the use of suitable pressure regulators such as are well-known to those skilled in the art of treating hydrocarbon vapors. Prior to the entry of the vapors into a primary bubble-tower the pressure may be stepped down from the 50 to 100 pounds per square inch gage pressure to the 10 to 15 pounds per square inch gage pressure for the making of a subjection of the vapors to a catalytic polymerization of the gum-forming vapors while they exist in a superheated condition. Thereupon polymerized products may be readily held in the vapor phase because the temperature is still yet above the temperature of their condensation under the pressure whose use is being employed in the making of the application of the treatment.

The hydrocarbon vapors may be measured with suitable orifice meters such as are well known to those skilled in the art of treating hydrocarbon vapors. Steam at a temperature of aproximately 340 to 370 degrees Fahrenheit may be continuously similarly measured. From 5 to 10% by volume of the measured steam may be continuously admixed with the hydrocarbon vapors being continuously withdrawn from the preliminary dephlegmation vessel.

As the withdrawn vapors already contain various amounts of hydrogen oxide vapor it is necessary to run control analyses of the treating-mixture zinc chloride content and hydrogen oxide content to determine permissible amounts of steam whose use may be employed. If the ratio be greater than 18 parts of zinc chloride to 1 part of hydrogen oxide, then such conditions have become adjusted so that the presence of an aqueous solution of zinc chloride could not have existed at the temperature of approximately 354 degrees Fahrenheit. By the means of manipulations of the amounts of steam admixed with the hydrocarbon vapors sufficient hydrocarbon vapors are caused to be present in the vapor phase mixture to render zinc chloride non-deliquescent. Similarly by the means of manipulations of the amounts of steam admixed with the hydrocarbon vapors sufficient hydrogen oxide vapor is caused to be present in the vapor phase mixture to render deliquescent the treating-mixture whose use is being employed in the treating of the vapor mixture. The vapor phase mixture is adjusted so that it does not contain sufficient hydrogen oxide vapor to maintain an aqueous solution of zinc chloride and it is adjusted so that it does contain sufficient hydrogen oxide vapor to lower the fusion-temperature of a mixture of the same ratio of quantities of ammonium chloride and ammonium pentachlorodizincate present in the treating-mixture.

The humidified hydrocarbon vapors may then be continuously passed into acid-proof equipment leading to the primary bubble-tower. The primary bubble-tower is also constructed of acid-proof materials such as are well-known to those skilled in the art of treating hydrocarbon vapors with hydrogen chloride.

In approximately equi-molecular proportions sufficient hydrogen chloride and ammonia to prevent vaporization of the ammonium chloride may then be continuously supplied to the humidified vapors in quantities such that the resulting ammonium chloride will remain in the vapor phase.

Sufficient hydrogen chloride to catalyze polymerization of the gum-forming vapors may then be continuously supplied to the humidified vapors.

Sufficient hydrogen chloride to prevent separation of zinc sulphide may then be continuously supplied to the humidified vapors.

At a temperature of approximately 340 to 370 degrees Fahrenheit and at a pressure of approximately 10 to 15 pounds per square inch gage pressure the humidified and acidified vapors may then be continuously passed into the bottom of a suitable primary bubble-tower and continuously withdrawn from it at the top thereof. A fused mixture of approximately 25% of ammonium chloride and of 75% of zinc chloride at a temperature of approximately 370 to 400 degrees Fahrenheit may then be continuously passed into the top of the primary bubble-tower and continuously withdrawn from it at the bottom thereof. Within the bubble-tower the vapors are brought into contact with the treating-mixture by bubbling therethrough in a series of superimposed pans such as are well known to those skilled in the art of treating hydrocarbon vapors. The vapors, from off of the top of each pan below, pass into the pan above at a point beneath the surface of the liquid therein. The treating-mixture, from off of the top of each pan above, passes into the pan below at a point beneath the surface of the liquid therein.

The treating of the hydrocarbon vapors in the primary bubble-tower may be controlled by the means of manipulations of the amounts of the ammonium chloride and of the amounts of the zinc chloride being passed into the top of the primary bubble-tower. There may be used approximately 6 pounds of ammonium chloride and 18 pounds of zinc chloride for each barrel of gasoline being supplied for treatment. It is to be understood that the amounts are merely expressed in terms of ammonium chloride and in terms of zinc chloride. The ingredients really exist in the treating-mixture in the form of ammonium chloride and in the form of ammonium pentachlorodizincate as has been shown in the results of research hereinbefore set forth.

By the means of manipulations of the amounts of the two ingredients of the fused treating-mixture being supplied to the top of the primary bubble-tower the resulting composition of mixture which is being continuously withdrawn from the bottom of the primary bubble-tower is thereby carefully maintained at a composition of approximately 4% of hydrogen oxide, 24% of ammonium chloride and 72% of zinc chloride. It is to be similarly understood that the amounts of the ingredients are expressed in terms of substances whose uses may be employed merely to reproduce such a liquid treating-mixture. The hydrogen oxide is absorbed by deliquescence from the humidified hydrocarbon vapors.

The treating of the humidified vapors in the primary bubble-tower may be controlled also by the means of manipulations of the amounts of the hydrogen oxide vapor content, hydrogen chloride content and ammonium chloride content of the vapor phase mixture being continuously supplied to the bottom of the primary bubble-tower. Cracked hydrocarbon vapors usually carry some ammonia content and some hydrogen oxide vapor content. Usually for each 1000 volumes of cracked hydrocarbon vapors there may be continuously supplied to cracked vapors approximately 100 volumes of hydrogen oxide vapor, 9 volumes of hydrogen chloride and 3 volumes of ammonia. Thereupon marked increased catalysis of polymerization of the gum-forming vapors may usually be observed.

The temperature of the treating of the hydrocarbon vapors in the primary bubble-tower may also be controlled by the means of manipulations of the amounts and temperatures of the hydrocarbon vapors and by the means of manipulations of the amounts and temperatures of the treating-mixtures which are being continuously supplied to the primary bubble-tower. Thereby the temperature of the treating-mixture which is being continuously withdrawn from the bottom of the primary bubble-tower is carefully maintained at a temperature of approximately 354 degrees Fahrenheit.

Gaseous ammonia may then again be continuously supplied to the treated hydrocarbon vapors having been continuously withdrawn from the primary bubble-tower. Sufficient quantities may be continuously supplied to the withdrawn hydrocarbon vapors to render the vapors slightly ammoniacal.

The ammoniacal hydrocarbon vapors may then be continuously supplied to the bottom of a secondary bubble-tower and continuously withdrawn from it at the top thereof. Aqueous solutions of calcium chloride may then be continuously passed into the top of the secondary bubble-tower and continuously withdrawn from it at the bottom thereof. Within the secondary bubble-tower the vapors may be brought into contact with the aqueous calcium chloride solution by bubbling therethrough in a series of superimposed pans such as are well known to those skilled in the art of treating vapors. The vapors, from off of the top of each pan below, pass into the pan above at a point beneath the surface of the liquid therein. The calcium chloride solution, from off of the top of each pan above, passes into the pan below at a point beneath the surface of the liquid therein. The calcium chloride solution partially cools and partially condenses the vapors thereby forming hydrocarbon liquid containing gums. The vapors generate hydrogen oxide vapor from the calcium chloride solution thereby facilitating the maintaining of the gasoline hydrocarbons in the vapor phase. The calcium chloride solution also extracts ammonium chloride from the vapors. The condensed hydrocarbon liquid also extracts from the hydrocarbon vapors gums that are resultant of catalysis of polymerization of the gum-forming vapors in the application of the treatment in the primary bubble-tower. Both liquids may be continuously withdrawn from the bottom of the secondary bubble-tower.

The treating of the hydrocarbon vapors in the secondary bubble-tower may be controlled by the means of manipulations of the amounts of the ingredients of solutions that are supplied to the top of the secondary bubble-tower. There may be supplied twenty pounds of calcium chloride in aqueous solution approximately for each barrel of gasoline that is being supplied for treatment. This is in order to adequately flush away condensing hydrocarbon liquid. Additional amounts of water may also be supplied in the calcium chloride solution in such quantities as are sufficient to offset such amounts of water as may be vaporized in the application of the treatment. By the means of manipulations of both amounts of ingredients of solutions supplied to the top of the secondary bubble-tower the resulting composition of the aqueous calcium chloride solution which is being withdrawn from the bottom of the secondary bubble-tower may be carefully maintained within the proportions of approximately 35 to 45% of water and 50 to 60% of calcium chloride.

The temperature of the exit flow of calcium chloride solution being continuously withdrawn from the bottom of the secondary bubble-tower may be carefully maintained at a temperature of approximately 275 to 325 degrees Fahrenheit by the means of manipulations of the temperatures, pressures and amounts of the hydrocarbon vapors and by the means of manipulations of the temperatures and amounts of calcium chloride solutions which are being continuously supplied to the secondary bubble-tower for the production of a gum-containing liquid.

More water is vaporized in the secondary bubble-tower when there are considerable amounts of heavy hydrocarbon vapors present. These amounts may be controlled by the means of manipulations of the pressures in the preliminary dephlegmation of the cracked hydrocarbon vapors.

In the treating of heavy hydrocarbon vapors the preferred embodiment may employ the use of zinc chloride to form an eutectic mixture with ammonium pentachlorodizincate in the primary bubble-tower. In the application of such a modification I may substitute the uses of the following specific factors: (1) the hydrocarbon vapors may be prepared at a temperature of approximately 400 to 450 degrees Fahrenheit, (2) the treating-mixture may be prepared to contain approximately 13% of ammonium chloride and 87% of zinc chloride, (3) the treating-mixture may be prepared at a temperature of approximately 450 to 480 degrees Fahrenheit, (4) the treating-mixture being withdrawn from the bottom of the primary bubble-tower may be controlled to have a temperature of approximately 444 degrees Fahrenheit and (5) the treating-mixture being withdrawn from the bottom of the primary bubble-tower may be controlled to have a composition of approximately 1% of hydrogen oxide, 13% of ammonium chloride and 86% of zinc chloride. It is to be understood that the amounts of the specific proportions are merely expressed in terms of ammonium chloride and in terms of zinc chloride. The ingredients really exist in the treating-mixture in the form of zinc chloride and in the form of ammonium pentachlorodizincate as has been shown in the results of research hereinbefore set forth.

After employing the uses of such specific factors in the primary bubble-tower there may be supplied approximately thirty pounds of calcium chloride in aqueous solution for each barrel of gasoline being subjected to treatment in the secondary bubble-tower.

After either modification of treatment the hydrocarbon vapors being continuously withdrawn from off of the top of the secondary bubble-tower may be continuously cooled and condensed whereby gasoline stock is formed.

By employing the use of ammonium pentachlorodizincate in an eutectic mixture it is found that greater hydrocarbon vapor throughput is effected in the primary bubble-tower. By employing the use of the heat liberated by the vapors condensed in the secondary bubble-tower for the generation of hydrogen oxide vapor to dilute the gasoline vapors in effecting the dephlegmation it is found that heat costs are lowered. Greater heat exchange is effected in employing the use of a higher temperature and of a higher pressure in effecting the preliminary dephlegmation of the cracked hydrocarbon vapors antecedent to their entry into the primary bubble-tower. The use of the excess heat in the hotter hydrocarbon vapors is employed to effect the generation of hydrogen oxide vapor in the secondary bubble-tower.

The condensed gasoline stock may then be further treated with an aqueous solution of sodium hydroxide and subsequently with an aqueous solution of alkaline sodium plumbite by processes well known to those skilled in the art of manufacturing gasoline by cracking sulphur bearing mineral oil.

Although I have hereinabove shown and described in detail only one process of contacting hydrocarbon vapors with ammonium pentachlorodizincate embodying my inventions, it is to be understood that various changes and modifications may be made in the effecting of the applications of my improvements in the processes of contacting hydrocarbon vapors with ammonium pentachlorodizincate without departing from the spirit of the inventions and the spirit and scope of the appended claims.

I claim:

1. In the contacting of hydrocarbon vapors with a treating-mixture containing ammonium pentachlorodizincate and ammonium chloride, the step which comprises contacting said vapors with a fused mixture containing sufficient ammonium pentachlorodizincate to prevent separation of ammonium chloride and sufficient ammonium chloride to prevent separation of ammonium pentachlorodizincate at a temperature above said treating-mixture fusion-temperature and at a temperature below 480 degrees Fahrenheit.

2. In the contacting of hydrocarbon vapors with a treating-mixture containing ammonium pentachlorodizincate and ammonium chloride, the combination of steps which comprises contacting said vapors with a fused mixture containing sufficient ammonium pentachlorodizincate to prevent separation of ammonium chloride and sufficient ammonium chloride to prevent separation of ammonium pentachlorodizincate at a temperature above said treating-mixture fusion-temperature and at a temperature below 480 degrees Fahrenheit, supplying ammonium pentachlorodizincate and ammonium chloride to the treating-mixture, separating and withdrawing the vapors from the treating-mixture and withdrawing from the treating-mixture a mixture of ammonium pentachlorodizincate and of ammonium chloride containing products of treatment.

3. In the contacting of vapors containing hydrocarbon vapors, gum-forming impurities and hydrogen chloride with a treating-mixture containing hydrogen chloride, ammonium pentachlorodizincate and ammonium chloride, the combination of steps which comprises supplying to said vapors sufficient hydrogen chloride to catalyze the polymerization of the gum-forming vapors and contacting said vapors with a fused mixture containing sufficient hydrogen chloride to catalyze the polymerization of the gum-forming impurities, sufficient ammonium pentachlorodizincate to prevent separation of the ammonium chloride and sufficient ammonium chloride to prevent separation of ammonium pentachlorodizincate at a temperature above said treating-mixture fusion-temperature and at a temperature below 480 degrees Fahrenheit.

4. In the contacting of vapors containing hydrocarbon vapors, hydrogen sulphide and hydrogen chloride with a treating-mixture containing hydrogen chloride, ammonium pentachlorodizincate and ammonium chloride, the combination of steps which comprises supplying to said vapors sufficient hydrogen chloride to prevent separation of zinc sulphide and contacting said vapors with a fused mixture containing sufficient hydrogen chloride to prevent separation of zinc sulphide, sufficient ammonium pentachlorodizincate to prevent separation of ammonium chloride and sufficient ammonium chloride to prevent separation of ammonium pentachlorodizincate at a temperature above said treating-mixture fusion-temperature and at a temperature below 480 degrees Fahrenheit.

FRANKLIN E. KIMBALL.